United States Patent [19]

Lucas et al.

[11] Patent Number: 5,176,872
[45] Date of Patent: Jan. 5, 1993

[54] POLYPROPYLENE RESINS FOR MULTIPLE CAVITY STRETCH BLOW MOLDING

[75] Inventors: Bennie M. Lucas; V. Krishnamurthy; John R. Bonser, all of Odessa, Tex.

[73] Assignee: Rexene Products Company, Dallas, Tex.

[21] Appl. No.: 836,966

[22] Filed: Feb. 19, 1992

[51] Int. Cl.⁵ .............. B29C 39/02; C08K 5/526; C08K 5/36; C08K 5/18; C08K 13/06

[52] U.S. Cl. ................ 264/532; 264/515; 264/516; 264/527; 524/255; 524/147; 524/291; 524/302

[58] Field of Search .......... 764/515, 516, 527, 532; 522/76, 78, 79, 80, 74, 17, 18; 524/255, 147, 291, 302

[56] References Cited

U.S. PATENT DOCUMENTS

| | | | |
|---|---|---|---|
| 2,989,451 | 6/1961 | Prochaska | 522/78 |
| 3,878,033 | 4/1975 | Zavasnik | 264/532 |
| 3,944,530 | 3/1976 | Sugita et al. | 264/532 |
| 4,036,719 | 7/1977 | Lyons | 522/76 |
| 4,110,185 | 8/1978 | Williams et al. | 522/80 |
| 4,274,932 | 6/1981 | Williams et al. | 522/80 |
| 4,569,736 | 2/1986 | Kosegaki et al. | 522/76 |
| 4,888,369 | 12/1989 | Moore | 522/76 |

*Primary Examiner*—Veronica P. Hoke
*Attorney, Agent, or Firm*—Harold E. Meier

[57] ABSTRACT

Improved resin compositions for use in multiple cavity stretch blow molding processes comprising: (a) a propyleneethylene copolymer resin including from about 5% to about 15% of a second stage polymer characterized by a cycle time of $T_1$, when used to produce containers in multiple cavity stretch blow molding processes; (b) from about 0.1% to about 1.0% of a nucleating agent prepared by irradiating in air a mixture of a propylene homo or copolymer and about 500 to about 3000 ppm of antioxidant with a sufficient amount of ionizing radiation to cause said nucleating agent to have a xylene insoluble content of at least 30%. The improved resin composition is characterized by a cycle time of $T_2$ when used to produce containers in multiple cavity stretch blow molding processes such that the ratio of $T_2/T_1$ is less than 0.95.

7 Claims, No Drawings

POLYPROPYLENE RESINS FOR MULTIPLE CAVITY STRETCH BLOW MOLDING

TECHNICAL FIELD

The present invention relates to improved polypropylene resins for use in multiple cavity stretch blow molding applications.

BACKGROUND OF THE INVENTION

The polymerization of propylene and mixtures of propylene and other monomers with Ziegler Natta type catalysts is well known in the art. Such catalysts typically consist of two components, an active transition metal compound such as a titanium halide and an organoaluminum compound such as an aluminum alkyl.

Propylene, with or without other monomers, is fed into a reactor with the catalyst. Hydrogen, which acts as a chain terminator, is used to control the degree of polymerization and consequently the melt flow rate of the homo or copolymer produced during the polymerization reaction.

Normally only one reactor is required to produce propylene homopolymer and random propylene/ethylene copolymer. In some cases, however, multiple reactors are used in series to obtain specific properties. For example, U.S. Pat. Nos. 4,760,113, 4,500,682 and 4,499,247, which are incorporated herein by reference, disclose multiple stage polymerization of propylene. The present invention relates to the use of propylene-ethylene copolymers produced by multiple stage polymerization in multiple cavity stretch blow molding applications.

Stretch blow molding, also known as biaxial orientation blow molding, is a well known process for producing articles such as food and beverage containers. The stretch blow molding process generally involves the following steps: (1) forming a parison or preform by extrusion or injection molding; (2) thermally conditioning the preform; (3) optionally pre-blowing the preform either before, after or during the conditioning process; and (4) stretch blowing to the final shape. Biaxial stretch blow molding of a thermoplastic material is a preferred process for producing small to medium size containers since the process will normally increase the material's tensile strength, barrier properties, drop impact and clarity. Stretch blow molding is described in *Blow Molding Handbook,* pp 52-56, 117-148, Hanser Publishers, (1989); *Plastics Blow Molding Handbook,* pp 83-114, Van Nostrand Reinhold, (1990); and Winkle et al, Extrusion Thermoforming and Stretch Blow Molding of Polypropylene, *Advances in Polymer Technology,* vol. 2 No. 2 pp. 107-140 (1982), all of which are incorporated herein by reference. Commercial stretch blow molding equipment is manufactured by Johnson Controls, Manchester Mich., Aoki Manufacturing Co. Tokyo, Japan, Nissei ASB Machine, Tokyo, Japan and others. Normally machines used for stretch blow molding are multiple cavity machines, having 4, 8, 16 or 32 cavities for continuous production.

Although it is possible to use a number of thermoplastic materials such as acrylonitrile, polystyrene, polyvinyl chloride, nylon, polycarbonate, polysulfone, acetal, polyarlyate, polypropylene and surlyn in stretch blow molding applications, polyethylene terephthalate has dominated the market for stretch blow molding applications due to its amorphous nature which allows stretch blowing immediately after cooling to stretching temperature. Alternatively, semicrystalline materials such as polypropylene must be cooled until substantial formation of crystalline regions occurs as the improvement in properties is dependent upon the orientation of crystalline regions in the material. Others factors weighing against the use of semi-crystalline materials such as polypropylene in stretch blow molding processes include obtaining the necessary uniformity in material distribution throughout the container walls and the precise temperature control normally required to achieve biaxial orientation of the material.

Uniformity of material distribution is especially desired in stretch blow molding processes as nonuniform distribution requires the use of additional material to insure that all portions of the container meet functional requirements. In the case of multi-cavity machines, variation between containers produced in the different cavities is another factor contributing to nonuniformity.

An important consideration in stretch blow molding operations is the cycle time which is dependent, at least in part, on the rate at which the material crystallizes. The rate at which a semicrystalline material such as polypropylene crystallizes can be increased with the addition of an extrinsic substance which acts as a seed or nuclei on which crystal growth can be initiated. Such substances are commonly referred to as nucleation agents and may consist of inorganic substances such as talc and other silicates, precipitated or ground calcium carbonates, sodium phosphates and stearates. Organic nucleating agents include dibenzylidene sorbitols and sodium benzoate. During the melt process, these substances either do not melt at all, or melt but solidify before the polymer, thus acting as nuclei for the initiation of crystallization.

The use of conventional nucleating agents has several disadvantages. First, the efficiency of the agent depends upon its particle size and the degree of dispersion and distribution of the agent in the polymer. Inorganic nucleating agents must have an extremely small particle size and be uniformly dispersed and distributed throughout the polymer to be efficient. Moreover, the addition of any foreign substance to the polymer can affect the physical and chemical properties, such as toxicity and extractability, of any product made from the polymer. This is especially critical in the case where the polymer is used to make a product that will come in contact with food or medical product.

Preferably, crystallization enhancement is achieved by treating or using a relatively small amount of material to facilitate processing of the polymer. It is also desirable that crystallization enhancement be accomplished without degrading the polymer. The limitations of prior art nucleating agents are overcome in the practice of the present invention by utilizing a nucleating agent comprising an irradiated polypropylene resin.

European Patent Application 88308452.7 discloses the use of propylene-ethylene resins having a melt flow rate greater than 50 gm/10 min, preferably about 60 or greater for producing stretch blow molded containers. European Patent Applications 84115106.1 and 87110734.8 disclose containers with a side wall having a percentage haze of 9% or smaller when converted to a wall thickness of 1 mm obtained by injection stretch blow molding of a propylene based resin. These references do not, however, address the issues of uniform material distribution or cycle time.

The foregoing references have not overcome the limitations of the prior art with respect to the use of propylene polymers for biaxial orientation blow molding process. Consequently, there exists a need for propylene based resins with enhanced mechanical and crystalline properties for use in stretch blow molding applications that overcome the inherent limitations of prior art resins.

SUMMARY OF THE INVENTION

The present invention provides an improved resin composition for use in multiple cavity stretch blow molding processes comprising: (a) a propylene-ethylene copolymer resin including from about 5% to about 15% of a second stage polymer characterized by a cycle time of $T_1$ when used to produce containers in multiple cavity stretch blow molding processes; (b) from about 0.1% to about 1.0% of a nucleating agent prepared by irradiating in air a mixture of a propylene homo or copolymer and about 500 to about 3000 ppm of antioxidant with a sufficient amount of ionizing radiation to cause said nucleating agent to have a xylene insoluble content of at least 30%. The improved resin composition is characterized by a cycle time of $T_2$ when used to produce containers in multiple cavity stretch blow molding processes such that the ratio of $T_2/T_1$ is less than 0.95.

DETAILED DESCRIPTION

The polypropylene resin of the present invention are produced in a multiple stage polymerization process. Catalyst, monomers and hydrogen are fed, in the required amounts into a first reactor for the initial polymerization step. Preferably, the monomers are propylene and ethylene. After a specified residence time in the first reactor, the mixture is transferred to a second reactor where polymerization is continued. One or more of the monomers are fed as necessary to the second reactor, however, no hydrogen is added during this step. Since the concentration of hydrogen in the second reactor is substantially lower than in the first reactor an enriched monomer environment exists. Thus, polymerization in the second reactor produces a polymer fraction with a higher molecular weight and longer chain length. This fraction of the polymer is referred to as second stage polymer and can be present in an amount from about 5% to about 15% (weight basis) of the total polymer. One such polypropylene incorporating second stage polymer which is suitable for use in the practice of the present invention is a random propylene/ethylene copolymer commercially available from Rexene Products Company, Odessa, Tex. under the trade designation 23M2CS198 that has a nominal melt flow rate of 2.0 dg/min (ASTM D1238), an ethylene content of about 2% and a density of 0.90 gm/cm$^3$. Another such polypropylene, also available from Rexene, is 23M10 a random propylene/ethylene copolymer having a nominal melt flow rate of 10.0 dg/min (ASTM D1238), an ethylene content of about 2% and a density of 0.90 gm/cm$^3$. It has been discovered that the use of such polypropylene resins increases the uniformity of material distribution in the walls of containers produced by stretch blow molding and reduces the variability of containers produced in different cavities of the same machine as compared to polypropylene resins produced through single step polymerization.

Additionally, the crystallization of polypropylene resins including second stage polymer can be enhanced to improve the performance of such resins in stretch blow molding applications. Enhancement of crystallization of such polypropylenes is achieved through the addition of a small portion of an irradiated propylene homo or copolymer.

Exposing a polymer such as polypropylene to sufficient ionizing radiation triggers a complex chain of events that leads to the generation of free radicals, polymer chain scissioning and cross-linking. The scissioning and cross-linking processes are believed to occur simultaneously and are generally a function of the polymer type, with one of the two processes normally predominating. In the case of polypropylene, when irradiation is carried out in air, the predominant process is chain scissioning rather than cross-linking. Chain scissioning has the effect of increasing the melt flow rate (MFR) as determined by ASTM method D1238, condition L. Cross-linking has the opposite effect, lowering the melt flow rate.

Ionizing radiation may consist of gamma rays or an electron beam. Ionizing radiation is measured in rads, and is normally expressed in megarads (Mrads) or millions of rads. Gamma rays may be provided from radioactive materials such as cobalt 60 and are highly penetrating but have a relatively slow process rate. Ionizing radiation may also be provided in the form of an electron beam from an electron beam accelerator which is normally characterized by the accelerator voltage and the electron beam current, or the number of electrons delivered per second. Electrons are less penetrating than gamma rays, but electron accelerators may have more capacity than gamma ray sources, up to several hundred kilowatts.

When polypropylene or propylene-ethylene copolymer or blends of the foregoing are treated with sufficient ionizing radiation, free radicals are formed and chain scission occurs as chemical bonds are broken. The free radicals thus formed also lead to cross-linking of the polymers. It is believed that the cross-linked polymers serve as nuclei for the initiation of crystallization, thereby enhancing the crystallization of the polymer. One measure of the degree of crystallization enhancement is the increase in the freeze point of the polymer as measured with a differential scanning calorimeter (DSC). An increase in DSC freeze point reflects a decrease in the time required for the polymer to crystallize and solidify when the polymer is melt processed.

Chain scissioning of the polymer, however, degrades the polymer and as such, is normally undesirable. It was, however, discovered that if an optimal amount of anti-oxidant were added to the polymer prior to exposing the polymer to ionizing radiation, cross-linking was accomplished while chain scission was controlled at an acceptable level. It is believed that the antioxidant acts as a free radical sponge or a scavenger, thereby controlling the chain scissioning process. The addition of excessive amounts of antioxidants, however, inhibits cross-linking to an undesirable extent. Preferably, antioxidant is added to the polymer at a rate of from about 500 to about 3000 ppm. More preferably, from about 500 ppm to about 1,500 ppm of antioxidant is used to control chain scissioning. Variation above and below these limits may be possible depending upon the effectiveness of the particular anti-oxidant and the absorbed radiation dosage. Antioxidants suitable for use in connection with the practice of the present invention include substituted phenols, amines, alkyl, aryl, and mixed alkyl-aryl phosphites, alkyl, aryl, and mixed alkyl-aryl phosphonates, alkali or alkaline metal salts of phosphonates, thioesters, thio compounds containing oxidizable sulphur and aryl nitroso compounds.

In the practice of the present invention, polypropylene or propylene/ethylene copolymer containing antioxidant is exposed to ionizing radiation in air to induce cross-linking and form a nucleating agent. Preferably, cross-linking is induced to the extent that a least a portion of the irradiated polymer is gelled as determined by an increase in xylene insolubles compared to the non-irradiated base polymer. More preferably, cross-linking is induced to the extent that the nucleating agent comprises at least 30% xylene insolubles.

It is contemplated that in the practice of the present invention, a small side stream of polypropylene resin, from about 0.01% to about 1.0% will be separated from the polymer stream, mixed with an antioxidant and exposed to ionizing radiation in air and then recombined with the non-irradiated polymer stream. Alternatively, a fraction, from about 0.01% to about 1.0% of a prepared polymer may be treated in a batch operation and recombined with the untreated polymer. In this manner, crystallization of the polypropylene resin may be enhanced rapidly, economically, and without the addition of any foreign substance to the polymer. Thus, in the practice of the present invention, crystallization enhancement is achieved without visbreaking or otherwise degrading the polymer.

The invention will be further described with respect to the following examples: however, the scope of the invention is not to be limited thereby.

EXAMPLE 1

Four Rexene propylene-ethylene copolymers were used to produce stretch blow molded 30 gram, 600 ml. wide mouth containers with an axial stretch ratio of 3 and a radial stretch ratio of 1.3 on an Aoki SBIII-250 four cavity injection stretch blow molding machine at cycle times of 20.6 to 20.9 seconds.

The propylene-ethylene copolymers tested included: (1) a random propylene-ethylene copolymer commercially available from Rexene Products Company of Odessa, Tex., under the trade designation 23M2CS198 having a nominal second stage polymer content of about 10%, a nominal melt flow rate of 2 dg/min and containing about 2% ethylene, 1,000 ppm Irganox 1330 (4, 4', 4''- [(2, 4, 6-trimethyl-1, 3, 5-benzenetriyl) tris (methylene)] tris [2, 6-bis (1, 1 dimethylethyl) phenol]) and about 60 ppm calcium stearate; (2) 23M2CS198 containing about 2500 ppm of a nucleating agent consisting of 23M2CS198 irradiated in air with ionizing radiation to a dosage of 15 Mrad; (3) a random propylene-ethylene copolymer produced in a single stage polymerization commercially available from Rexene under the trade designation 13T10A having a nominal melt flow rate of 10 dg/min and containing about 3.5% ethylene, 2250 ppm of a sorbitol based nucleating agent sold under the trade designation Millad 3905, about 1,500 ppm of a mixture of 50% by weight Irganox 1010 (2,2-bis [[3-[3,5-bis(1,1 dimethylethyl)-4-hydroxyphenyl] -1-oxopropoxy]methyl]-1,3-propanoate propanediyl 3,5-bis(1,1-dimethylethyl)-4-hydroxybenzene) and 50% Irgafos 168 (2,4-bis(1,1-dimethylethyl) phenylphosphite (3:1)), about 250 ppm of a synthetic dihydro talcite and about 1000 ppm calcium stearate; and (4) a random propylene-ethylene copolymer produced in a single stage polymerization commercially available from Rexene under the trade designation 13T25A having a nominal melt flow rate of 25 dg/min and containing about 3.5% ethylene. and the same additives as 13T10A. except that the nucleating agent is a sorbitol based nucleating agent sold under the trade designation NC-4.

Irganox 1010, Irganox 1330 and Irgafos 168 are commercially available from CIBA-GEIGY and the synthetic dihydro talcite is available from Mitsui Chemical Co. of Houston, Tex. under the trade designation DHT4A. NC-4 is also available from Mitsui. Millad 3905 is available from Miliken Chemical Co. Spartanburg, S.C.

Containers produced were divided into three vertical sections and the thickness of the sections were measured in each section at 90° intervals with a micrometer. Sections cut from the containers were tested for tensile modulus values in the radial and axial directions according to ASTM D638. The measured tensile values were used as a measure of molecular orientation; in the case of true biaxial orientation, the tensile values would be equal. The uniformity of the molecular orientation among the various cavities was estimated from the coefficient of variation (ratio of the standard deviation to the mean) calculated from the tensile modulus values from all of the cavities. Smaller values of the coefficient of variation reflect more uniform molding among the different cavities. Test results are summarized in Tables 1-4 below:

TABLE 1

| Resin | MFR* | Second Stage Polymer | Nucleating Agents Used* |
|---|---|---|---|
| 1 | 2.0 | Yes | None |
| 2 | 2.0 | Yes | 2500 ppm of resin 1 irradiated at 15 Mrads |
| 3 | 10.0 | No | 2500 ppm of Millad 3905 |
| 4 | 25.0 | No | 2500 ppm of NC4 |

*melt flow values and concentrations are nominal values throughout.

TABLE 2

Tensile Modulus Values (Kpsi)
Each value is the average of 5 samples collected every 5 minutes
(Axl = Axial, Rad = Radial)

| Resin | Cavity 1 | | Cavity 2 | | Cavity 3 | | Cavity 4 | |
|---|---|---|---|---|---|---|---|---|
|  | Axl | Rad | Axl | Rad | Axl | Rad | Axl | Rad |
| 1 | 74 | 76 | 77 | 64 | 75 | 69 | 77 | 71 |
| 2 | 92 | 87 | 83 | 75 | 80 | 78 | 92 | 81 |
| 3 | 99 | 63 | 88 | 81 | 95 | 64 | 88 | 48 |
| 4 | 94 | 50 | 81 | 57 | 87 | 54 | 87 | 41 |

TABLE 3

| Resin | Coefficient of Variation |
|---|---|
| 1 | 6.3% |
| 2 | 7.6% |
| 3 | 23.0% |
| 4 | 29.7% |

TABLE 4

Wall Thickness Uniformity

| Resin | Uniformity |
|---|---|
| 1 | Excellent |
| 2 | Good |
| 3 | Fair |

TABLE 4-continued

| Wall Thickness Uniformity | |
|---|---|
| Resin | Uniformity |
| 4 | Fair |

The results of Example 1 illustrate that the use of polypropylenes containing second stage polymer in stretch blow molding applications results in a more uniform product, in terms of variability within a single container and between containers produced in different cavities of a single machine.

EXAMPLE 2

Seven Rexene random propylene-ethylene copolymer resins were used to produce stretch blow molded containers on the Aoki SBIII-250 four cavity injection stretch blow molding machine at a cycle time of 19.3 seconds. These resins included: (1) X01232, a random propylene-ethylene copolymer with about 2.3% ethylene having a nominal second stage polymer content of about 9%, a nominal melt flow of about 10 and containing about 1000 ppm Irganox 1330, 1000 ppm calcium stearate and 750 ppm synthetic dihydro talcite; (2) X01234, a random propylene-ethylene copolymer with about 2.3% ethylene having a nominal second stage polymer content of about 9%, a nominal melt flow of about 10 and containing about 1000 ppm Irganox 1330, 80 ppm calcium stearate and 750 ppm synthetic dihydro talcite; (3) X0347, a random propylene-ethylene copolymer with about 2.5% ethylene having a nominal melt flow of about 10.5 and containing about 1000 ppm Irganox 1330, 1000 ppm calcium stearate and 1500 ppm synthetic dihydro talcite; (4) 23M10, a random propylene-ethylene copolymer with about 2.3% ethylene having a nominal second stage polymer content of about 10%, a nominal melt flow of about 10 and containing about 1000 ppm Irganox 1330 and 80 ppm calcium stearate; (5) X0351, a random propylene-ethylene copolymer with about 2.3% ethylene having a nominal melt flow of about 10 and containing about 1000 ppm Irganox 1330 and 80 ppm calcium stearate; (6) 23M10CS259, which is 23M10 containing about 2500 ppm of a nucleating agent consisting of 23M2CS198 irradiated in air with ionizing radiation to a dosage of 15 Mrad; and (7) RI0359, a random propylene-ethylene copolymer with about 3.5% ethylene having a nominal melt flow rate of less than about 0.01 and containing about 1000 ppm of a mixture of 50% Irganox 1010 and Irgafos 168, 200 ppm calcium stearate and 1500 ppm synthetic dihydro talcite, visbroken to 10 MFR using peroxide.

The cycle time was reduced for each of the resins in order to determine the lowest cycle time that could be achieved with the resin. The containers produced were tested as in Example 1, and the results are summarized below in Tables 5-9 below:

TABLE 5

| Resin | MFR | Second Stage Polymer | Nucleating Agents Used |
|---|---|---|---|
| X01232 | 10.0 | Yes | None |
| X01234 | 10.0 | Yes | None |
| X0347 | 10.0 | No | 1500 ppm of NC4 |
| 23M10 | 10.0 | Yes | None |
| X0351 | 10.0 | No | None |
| 23M10CS259 | 10.0 | Yes | 2500 ppm of 23M2CS198 irradiated at 15 Mrads |
| R10359 | 10.0 | No | None |

TABLE 6

Tensile Modulus Values (Kpsi)
Each value is the average of 4 samples
collected every 6th cycle
(Axl - Axial, Rad = Radial)

| Resin | Cavity 1 | | Cavity 2 | | Cavity 3 | | Cavity 4 | |
|---|---|---|---|---|---|---|---|---|
| | Axl | Rad | Axl | Rad | Axl | Rad | Axl | Rad |
| X01232 | 103 | 93 | 101 | 107 | 99 | 102 | 100 | 93 |
| X01234 | 100 | 81 | 106 | 99 | 106 | 103 | 104 | 87 |
| X0347 | 100 | 78 | 109 | 94 | 103 | 93 | 102 | 88 |
| 23M10 | 85 | 86 | 85 | 86 | 86 | 95 | 85 | 84 |
| X0351 | 88 | 77 | 87 | 82 | 86 | 79 | 85 | 76 |
| 23M10CS259 | 92 | 74 | 99 | 96 | 92 | 93 | 96 | 89 |
| R10359 | 71 | 62 | 81 | 74 | 81 | 65 | 77 | 67 |

TABLE 7

| Resin | Coefficient of Variation |
|---|---|
| X01232 | 4.8% |
| X01234 | 9.5% |
| X0347 | 10.2% |
| 23M10 | 4.1% |
| X0351 | 5.7% |
| 23M10CS259 | 8.4% |
| R10359 | 10.0% |

TABLE 8

| Wall Thickness Uniformity | |
|---|---|
| Resin | Uniformity |
| X01232 | Good |
| X01234 | Good |
| X0347 | Fair |
| 23M10 | Excellent |
| X0351 | Fair |
| 23M10CS259 | Good |
| R10359 | Fair |

TABLE 9

| Fastest cycle time achieved (seconds) | |
|---|---|
| Resin | Best Cycle Time |
| X01232 | 17.6 |
| X01234 | 18.4 |
| X0347 | 19.3 |
| 23M10 | 21.2 |
| X0351 | 19.3 |
| 23M10CS259 | 16.6 |
| R10359 | 17.3 |

The foregoing results illustrate that polypropylene resins containing second stage polymer generally produce more uniform containers in stretch blow molding processes.

Additionally, the ratio $T_2/T_1$ of the cycle times achieved for 23M10 ($T_1$) and 23M10CS259 ($T_2$), is 0.78, indicating that the polypropylene resins containing a nucleating agent consisting of an irradiated polypropylene achieved a significantly lower cycle time in stretch blow molding processes.

EXAMPLE 3

Three Rexene propylene-ethylene copolymers including 23S2A, a random propylene-ethylene copolymer with about 2.3% ethylene having a nominal melt of about 2 and containing about 1200 ppm of a mixture of 50% Irganox 1010 and Irgafos 168, 1000 ppm calcium stearate and 750 ppm synthetic dihydro talcite, were used to produce stretch blow molded 50 gm 1 liter narrow mouthed bottles with an axial stretch ratio of 1.33 and a radial stretch ratio of about 3.0 containers on an Nissei ASB NH50 8 cavity machine. The lowest cycle time achieved for each of the three materials is set forth in table 10 below:

TABLE 10

| Resin | MFR | second stage Polymer | Best Cycle Time |
| --- | --- | --- | --- |
| 23S2A | 2 | yes | 30.9 |
| 23M2CS198 | 2 | yes | 30.7 |
| 23M10CS259 | 10 | yes | 27.0 |

The foregoing confirms the reduction in cycle time that may be achieved from the use of a nucleating agent comprising irradiated polypropylene as opposed to comparable resins without the nucleating agent.

EXAMPLE 4

One measure of crystallization enhancement achieved in the practice of the present invention is the increase in DSC freeze point resulting from the addition of irradiated polypropylene. This example illustrates the preparation of the nucleating agent used in the practice of the present invention and the importance of the xylene insoluble content of the irradiated polypropylene which reflects the extent of cross-linking and gelation.

A propylene-ethylene copolymer (23M2CS198) was treated in air with from about 5 to about 35 Mrads of gamma radiation in 5 Mrad increments and tested for xylene insoluble content by refluxing in boiling xylene for 12 hours. The irradiated polymer was then added to untreated copolymer at levels of 2,500 ppm and 5,000 ppm and tested for DSC freeze points using a Perkin Elmer Model DSC-2C differential scanning calorimeter (DSC). The test results are set forth in Table 11 below.

TABLE 11

| | DSC Freeze Points (°C.) (Control - 97.3) | | |
| --- | --- | --- | --- |
| Dosage (MRADS) | Xylene Insoluble Content % | 2500 ppm | 5000 ppm |
| 0 | 0.0 | — | — |
| 5 | <0.1 | 104.7 | 104.5 |
| 10 | <0.1 | 106.8 | 107.3 |
| 15 | 34.3 | 108.1 | 108.4 |
| 25 | 35.8 | 104.3 | 106.2 |
| 35 | 41.9 | 103.3 | 104.3 |

The increase in xylene insoluble content for the polymer treated with 15, 25 and 35 Mrads of ionizing radiation indicates that substantial gelation and cross-linking of the polymer occurs when the polymer is irradiated to a dosage greater than 10 Mrad. It is also noteworthy that the greatest increase in DSC freeze point resulted from the addition of the polymer treated with 15 Mrads of ionizing radiation and the magnitude of the increase in DSC freeze point declined when the polymer treated with 25 and 35 Mrads of ionizing radiation was mixed with the base polymer. Thus, in order to obtain the desired increase in DSC freeze point, the xylene insoluble content of the irradiated polymer, which reflects the extent of cross-linking and gelation, is advantageously at an optimum level, for example 30%.

EXAMPLE 5

A nucleating agent was prepared by irradiating a polypropylene homopolymer commercially available from Rexene Products Company of Odessa, Tex., under the trade designation 41E4CS215 containing about 1000 ppm of a substituted phenol antioxidant commercially available from CIBA-GEIGY Corp., Plastics Division, of Hawthorne, N.Y. 10532 under the trade designation Irganox 1330 (4, 4', 4"-[(2, 4, 6-trimethyl-1, 3, 5-benzenetriyl) tris (methylene)] tris [2, 6-bis (1, 1 dimethylethyl) phenol]) with 15 Mrads of gamma radiation. The irradiated nucleating agent was added to 23M2CS198 at rates from 1000 to 10,000 ppm and the resulting mixtures were tested for DSC freeze point. The results are set forth in Table 12 below:

TABLE 12

| Nucleating Agent (ppm) | DSC Freeze Point (°C.) |
| --- | --- |
| 0 | 97.3 |
| 1000 | 108.3 |
| 5000 | 108.8 |
| 10,000 | 112.0 |

The increases in DSC freeze point set forth in Table 12 above illustrate that a nucleating agent comprising an irradiated propylene homopolymer may be advantageously used in the practice of the present invention.

EXAMPLE 6

The swell ratios of the polymers used in the foregoing examples were determined by measuring the diameter of a semi-molten extrudate from a 0.0825 inch die using a standard melt indexer with a dead weight of 4.9 Kg. at 210° C. The diameter of the extrudate was measured at a point approximately 5.0 cm. from the tip of the die using a Model No. 163-100 dual axis laser scanner manufactured by LaserMike, Inc. Dayton, Ohio. Measurements were taken every two seconds for ten seconds and the five measurements were averaged. The swell ratio is the ratio of the average extrudate diameter to the die diameter. The results are set forth in Table 13 below:

TABLE 13

| Resin | Swell Ratio | Comments |
| --- | --- | --- |
| 23S2A | 1.45 | second stage polymer |
| 13T10A | 1.18 | no second stage polymer |
| X01232 | 1.41 | second stage polymer |
| X01234 | 1.39 | second stage polymer |
| 23M2CS198 | 1.55 | second stage polymer |
| 23M10 | 1.72 | second stage polymer |
| 23M10CS259 | 1.71 | second stage polymer |
| X0351 | 1.49 | no second stage polymer |
| R10359* | 1.00 | no second stage polymer |

*visbroken with peroxide

The results tabulated in Table 13 above indicate that the resins containing second stage polymer generally have a higher swell ratio than the resins with no second stage polymer, reflecting the presence of the longer chain lengths of the second stage polymer. Comparison of the results obtained for 23M10 and 23M10CS259 demonstrates that the addition of the irradiated nucleating agent does not have any appreciable effect on the swell ratio, indicating that the long chain second stage polymer fraction is not degraded or visbroken by the addition of the irradiated nucleating agent.

While particular embodiments of the present invention have been illustrated and described, it will be apparent to those skilled in the art that various changes and modifications may be made without departing from the spirit and scope of the invention.

We claim:

1. An improved resin composition for use in multiple cavity stretch blow molding processes comprising:
   (a) a propylene-ethylene copolymer resin including from about 5% to about 15% of a second stage polymer characterized by a cycle time of $T_1$ when used to produce containers in multiple cavity stretch blow molding processes;
   (b) from about 0.1% to about 1.0% of a nucleating agent prepared by irradiating in air a mixture of a propylene homo or copolymer and about 500 to about 3000 ppm of antioxidant with a sufficient amount of ionizing radiation to cause said nucleating agent to have a xylene insoluble content of at least 30%;
   said resin composition characterized by a cycle time of $T_2$ when used to produce articles in multiple cavity stretch blow molding processes such that the ratio of $T_2/T_1$ is less than 0.95.

2. The resin composition of claim wherein the antioxidant is selected from the group consisting of substituted phenols, amines, phosphites, thioesters, thio compounds containing oxidizable sulphur, phosphonates, aryl nitroso compounds and mixtures thereof.

3. The resin composition of claim 1 wherein said nucleating agent is irradiated with a dosage of from about 10 to about 20 Mrads of ionizing radiation in air.

4. The resin composition of claim 1 wherein said nucleating agent is irradiated with a dosage of about 15 Mrads.

5. The resin composition of claim 1 wherein said nucleating agent contains from about 500 to about 1500 ppm of antioxidant.

6. The resin composition of claim 1 wherein the antioxidant is selected from the group consisting of 4, 4', 4''-[(2, 4, 6-trimethyl-1, 3, 5-benzenetriyl) tris (methylene)] tris [2, 6-bis (1, 1 dimethylethyl) phenol], 2, 6-di-tert-butyl-para-cresol, (2,2-bis [[3 3, 5-bis (1, 1 dimethylethyl)-4 -hydroxyphenyl]-1-oxopropoxy] methyl]-1,3-propanoate propanediyl 3,5-bis(1,1-dimethylethyl)-4-hydroxybenzene), (2,4-bis(1,1-dimethylethyl) phenylphosphite and mixtures thereof.

7. A process for reducing the cycle time of multiple cavity stretch blow molding processes comprising the steps of:
   preparing a resin composition comprising:
   (a) a propylene-ethylene copolymer resin including from about 5% to about 15% of a second stage polymer characterized by a cycle time of $T_1$ when used to produce containers in multiple cavity stretch blow molding processes;
   (b) from about 0.1% to about 1.0% of a nucleating agent prepared by irradiating in air a mixture of a propylene homo or copolymer and about 500 to about 3000 pp of antioxidant with a sufficient amount of ionizing radiation to cause said nucleating agent to have a xylene insoluble content of at least 30%;
   said resin composition characterized by a cycle time of $T_2$ when used to produce containers in multiple cavity, stretch blow molding processes such that the ratio of $T_2/T_1$ is less than 0.95;
   and using the resin composition to produce articles in multiple cavity stretch blow molding processes.

* * * * *

UNITED STATES PATENT AND TRADEMARK OFFICE
CERTIFICATE OF CORRECTION

PATENT NO. : 5,176,872

DATED : January 5, 1993

INVENTOR(S) : Bennie M. Lucas, et al.

It is certified that error appears in the above-identified patent and that said Letters Patent is hereby corrected as shown below:

Abstract, line 1, before "improved", insert "An".
Abstract, line 3, change "propyleneethylene" to --propylene-ethylene--.
Abstract, line 7, after "processes", insert --and--.
Col. 3, line 19, change "homo" to -- homo- --.
Col. 3, line 29, change "are" to --is--.
Col. 3, line 32, after "amounts", insert --,--.
Col. 3, line 38, after "reactor", insert --;--.
Col. 3, line 56, after "23M10", insert --,--.
Col. 4, line 48, after "and", insert --,--.
Col. 5, line 16, delete "and", and insert --,--.
Col. 5, line 19, after "1.0%", insert --,--.
Col. 5, line 42, after "23M2CS198", insert --,--.
Col. 5, line 48, after "23M2CS198", insert --,--.
Col. 5, line 54, after "13T10A", insert --,--.
Col. 6, line 1, after "ethylene", delete ", and".
Col. 10, line 12, after "41E4CS215", insert --,--.
Col. 11, line 31, after "Claim", insert --1--.
Col. 12, line 28, change "pp" to --ppm--.
Col. 5, line 67, after "13T25A", insert --,--.

Signed and Sealed this

Twenty-eight Day of March, 1995

Attest:

BRUCE LEHMAN

Attesting Officer

Commissioner of Patents and Trademarks